United States Patent Office 2,741,618
Patented Apr. 10, 1956

2,741,618

PRODUCTION OF PYRIDINE BASES AND CATALYST THEREFOR

Frank G. Young, Charleston, W. Va., assignor to Union Carbide and Carbon Corporation, a corporation of New York No Drawing. Application January 27, 1953, Serial No. 333,607

6 Claims. (Cl. 260—290)

This invention relates to a novel process for the production of pyridine and alkylated pyridines, and more especially it concerns their production from certain 2-alkoxy-3,4-dihydro-2H-pyrans.

More specifically the invention is directed to a novel process for the production of pyridines and alkylated pyridines by reacting together in the vapor phase at elevated temperatures a 2-alkoxy-3,4-dihydro-2H-pyran, ammonia, steam and hydrogen, in the presence of a novel solid catalyst consisting of an essentially alkali-free activated gamma alumina impregnated with small amounts of copper and chromium, and preferably with a small amount of an alkali metal sulfate catalyst promoter.

Heretofore pyridine and the alkylated pyridines have been produced commercially in connection with the refining of coal tars from which it is difficult to isolate them in a state of high purity.

Various attempts have been made to produce pyridines synthetically. These usually have been based upon high temperature reactions (above 400° C.) of various organic compounds with ammonia, cyanogen, cyanogen halides, hydrogen cyanide and nitriles. One such process used as starting materials a 2-alkoxy-3,4-dihydro-2H-pyran and ammonia and was conducted in the vapor phase in the presence of a solid dehydrogenation catalyst. It, in common with the other processes, gave relatively low yields of the desired product.

The novel process of this invention possesses the outstanding advantages that it yields pyridine and alkylated pyridines directly in a single reaction step and in a state of high purity, uncontaminated by isomers and homologs that are difficult or impossible to separate from the desired product. The invention provides a source of pyridine and alkylated pyridines that is independent of the coal-tar industry.

Among the more important objects of the invention are the following: the provision of a novel process for the production of pyridine bases in good yields and high purity from 2-alkoxy and 2-alkoxyalkoxy-3,4-dihydro-2H-pyrans; the production of pyridine bases by the vapor phase reaction of a 2-alkoxy-3,4-dihydro-2H-pyran with ammonia in the presence of an excess of added steam and an excess of added hydrogen over the amounts thereof believed to be formed in the reactions involved; and the provision of a novel dehydrogenation catalyst producing outstandingly high yields of pyridine bases of high purity in the reaction of ammonia with 2-alkoxy- and 2-alkoxyalkoxy-3,4-dihydro-2H-pyrans.

The present invention is based in part upon the discovery that pyridine and alkylated pyridines can be prepared in good yields and high purity by conducting a stream of vapors of certain 2-alkoxy-3,4-dihydro-2H-pyrans in admixture with ammonia, steam and added hydrogen, over a novel solid dehydrogenation catalyst, comprising a substantially alkali-free activated gamma-alumina, copper and chromium, with or without a small amount of an alkali metal sulfate, in a reaction zone maintained at an elevated temperature within the range from 200° C. to 350° C.

The 2-alkoxy-3,4-dihydro-2H-pyrans useful in this process correspond to the general formula:

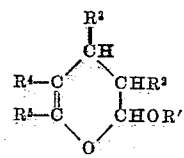

Wherein R' represents an alkyl group having 1 to 3 carbon atoms or an alkoxyethyl group wherein the alkoxy group contains 1 to 3 carbon atoms, and $R^2$ to $R^5$, respectively, represent hydrogen, or an alkyl group having 1 to 3 carbon atoms.

In accordance with one preferred form of the invention the liquid 2-alkoxy-3,4-dihydro-2H-pyran or a ring-substituted alkyl derivative thereof is vaporized at a temperature below its decomposition point, the resultant vapors are mixed with steam, gaseous ammonia and hydrogen, and the mixture is heated to a temperature within the range from about 200° C. to about 350° C. The heated vapor mixture flows into contact with a novel catalyst hereinafter described, present in the heated reaction zone. The effluent vapors leaving the reaction zone are cooled and condensed; the pyridine or alkyl pyridine then is separated from the aqueous portion of the condensate in suitable manner, as by dehydration and distillation of the condensate, by distillation followed by extraction of the distillate, or by other known methods, as hereinafter described.

The preferred reaction temperature varies somewhat with the particular alkoxydihydropyrans used but resides in the range from 250° C. to 325° C. At temperatures much below 200° C. the conversion to pyridines is substantially reduced, although efficiencies based upon the alkoxydihydropyrans actually consumed may remain high. At temperatures above 350° C. side reactions begin to assume importance.

Amounts of 2-alkoxy-3,4-dihydro-2H-pyrans up to 6 mols per liter of catalyst per hour can be reacted by the process without adversely affecting the initial yield of pyridines. A feed rate of about 1 mol of such pyran per liter of catalyst per hour is preferred, and gives optimum yields of the pyridine base and optimum catalyst life.

The molar ratio of ammonia to the 2-alkoxy-3,4-dihydro-2H-pyran in the vaporous mixture being reacted can vary from about 1 to 8 mols of ammonia per mol of the said ethers, although molar ratios of around 6 mols of ammonia per mol of such ether are preferred.

While water is not consumed in the process but actually is one of the reaction products, it is important to have a high proportion of steam present in the reaction zone. The added steam does not act solely as an inert diluent for the other reactants since, if it is replaced by an inert gas such as nitrogen, the yield of pyridine is decreased substantially. The amount of added steam present in the mixture being reacted can vary widely, ranging from 1 mol to 24 mols of steam per mol of the 2-alkoxy-3,4-dihydro-2H-pyran. A molar ratio of steam to the said ether of 16:1 is preferred.

The amount of added hydrogen present in the mixture flowing to the reaction zone is high, usually ranging between 2 and 10 mols of hydrogen per mol of the 2-alkoxy-3,4-dihydro-2H-pyran, and preferably is about 4.5 mols of hydrogen per mol of the said ether.

The process can be conducted in the presence of a reduced copper catalyst precipitated on a porous support of activated alumina. Such a catalyst however has a very short life, and its use is not commercially practicable. It has been discovered that certain catalysts comprising a major portion of a porous activated alumina and minor amounts of (1) copper, which can be mostly in the form of metallic copper, and of (2) chromium, which can be mostly in the form of its oxide, are highly effective in the process and provide excellent yields of pyridine bases of high purity. Those catalysts comprising from 0.5% to 6% by weight of copper and from about 0.1% to about 2% or more by weight of chromium, the balance being an activated substantially alkali-free alumina, are highly satisfactory. In these the weight ratios of chromium to copper is in the range from 0.04 to 0.4. The active life of such a catalyst is prolonged by the presence therein of a small amount—i. e., conveniently from 0.05% to 0.10% or more by weight—of an alkali metal sulfate such as sodium sulfate, as is hereinafter described. Increasing improvement in the catalyst is effected by increasing the total metal contents thereof up to about 7%, but no further improvement is noted at higher percentages, although these higher metal contents are not chemically disadvantageous. The weight ratio of alkali metal sulfate to copper preferably does not exceed 0.2.

It is important that the active alumina used in making the catalyst be substantially free from alkalies. Useful aluminas are the low-soda-content activated gamma-aluminas such as that now being marketed under the tradename "Alorco F–10" alumina. A preferred catalyst that has yielded excellent results in the process consists of 4.75% of copper, 0.19% of chromium, 0.09% of sodium sulfate, all by weight, the balance being a gamma-alumina in the form of pieces passing a 4-mesh screen but held on an 8-mesh screen, which alumina acts also as a catalyst support.

The catalyst can be prepared by any of the well known methods. Thus, the alumina can be impregnated with an aqueous solution of thermally unstable salts of copper and of chromium, with or without an aqueous solution of an alkali metal sulfate such as sodium sulfate or potassium sulfate, the water evaporated, and the unstable salts decomposed to the metal oxides by heating above the decomposition temperature in air. The copper oxide then is reduced in a stream of hydrogen at the reaction temperature to be used in the process.

The following examples will serve to illustrate the invention:

EXAMPLE I

A solution of 76 parts of cupric nitrate trihydrate, 6.2 parts of chromic nitrate nonahydrate and 0.37 parts of sodium sulfate in 200 parts of water was poured over 400 parts of gamma-alumina which has been previously sized to pass a 4-mesh screen but be retained by an 8-mesh screen. The solution was evaporated to dryness with agitation. The dried product was heated to 500° C. in a current of air to decompose the nitrates to the oxides. After cooling, the catalyst was charged into a 2-inch inner diameter iron reactor tube provided with means for heating the tube and contents. Air was displaced from the tube and the catalyst was heated to a temperature in the range 200°–350° C. while a stream of hydrogen was passed over it for several hours. The reactor tube had connected therewith means for vaporizing liquid reactants, means for feeding a vaporous mixture of reactants to the reactor tube, and means for collecting and condensing the reaction products.

There were fed simultaneously to the reactor tube containing 500 c. c. of the above-described catalyst maintained at 275° C., 883 c. c. (6.64 mols) of 2-ethoxy-3,4-dihydro-2H-pyran at the rate of 65 c. c. per hour, 1914 c. c. of water at the rate of 125 c. c. per hour, 865 liters (600 grams) of gaseous ammonia at a rate of 57 liters per hour, and hydrogen at a rate of 50 liters (about 4 grams) per hour, during a period of 15.25 hours. Each of the liquids was vaporized separately, and the vapors were mixed before contacting the catalyst bed. The effluent vapors were condensed at about 30° C. The condensate contained 442.5 grams of pyridine, corresponding to a yield of 84%, based upon the dihydropyran. By dehydration and distillation of the condensate, 440 grams of pyridine of excellent purity were recovered.

EXAMPLE II

Following the general conditions described in Example I, 182 grams of 2-ethoxyethoxy-3,4-dihydro-2H-pyran and 385 grams of water were separately vaporized, mixed with 118 grams (170 liters) of gaseous ammonia and about 12 grams (150 liters) of hydrogen, and the mixture was led through the reaction tube and over the catalyst described in Example I, maintained at 300° C., during 3 hours, at a space velocity of 986 liters per liter of catalyst per hour. The effluent gases were condensed at about 30° C., and the condensate was redistilled and the distillate dehydrated by azeotropic distillation at atmospheric pressure of the contained water with benzene as the entraining agent, yielding 49 grams of pure pyridine, representing a yield of 58%, based upon the dihydropyran starting material.

The important advantages secured in the process when incorporating in the catalyst a small amount of an alkali metal sulfate are illustrated in the following examples.

EXAMPLES III AND IV

A catalyst A was prepared by processing an aqueous solution of 152 parts of C. P. cupric nitrate trihydrate and 12.3 parts of C. P. chromic nitrate nonahydrate in 300 parts of distilled water over 800 parts of 4 to 8 mesh "Alorco F–10" alumina, a low-alkali grade gamma-alumina, all parts by weight. The mixture was stirred while evaporating to dryness, and the dried pellets were heated for 4.5 hours at 350° C. in an oven. The catalyst then was reduced with hydrogen as in Example I.

A second catalyst B was prepared in manner identical with that used in making catalyst A with the exception that 0.74 part by weight of anhydrous sodium sulfate was added to the aqueous solution of the cupric and chromic compounds before pouring it on the alumina. The catalyst contained 1.85 parts of sodium sulfate per 100 parts of copper.

In each of two runs, 400 parts of one of the aforesaid catalysts was heated to 300° C., and 58 parts per hour of 2-ethoxy-3,4-dihydro-2H-pyran, 125 parts per hour of water vapor, 39.4 parts per hour of gaseous ammonia and 8.1 parts per hour of hydrogen, all parts by weight, were mixed and the mixture fed over the catalyst. The effluent vapors were condensed at about 30° C. and intermittently analyzed for pyridine content. From these results the yield of pyridine, based upon the dihydropyran fed was calculated. The improvement in yields when using the alkali metal sulfate activating agent is especially noticeable after the catalyst has been on stream for a few hours, as indicated in the following table:

| Hours Operation | Pyridine Yields, Percent | |
| --- | --- | --- |
| | Using Catalyst A | Using Catalyst B |
| Initial | 75 | 78 |
| 5 | 73 | 78 |
| 10 | 70 | 78 |
| 20 | 65 | 76 |
| 30 | 60 | 73 |

Each of the catalysts, A and B contained about 5 parts of copper and about 0.2 part of chromium, per 100 parts of alumina. Catalyst B also contained about 0.09 part of sodium sulfate per 100 parts of alumina, all parts by weight.

EXAMPLE V

During 21 hours, 1105 grams of 2-ethoxy-4-methyl-3,4-dihydro-2H-pyran and 2460 grams of water were vaporized, mixed with 830 grams (1200 liters) of gaseous ammonia and about 86 grams (1050 liters) of hydrogen and the mixture fed at a uniform rate over a period of 21 hours into contact with the catalyst described in Example I, maintained at 275°–280° C. The effluent vapors were condensed at about 30° C. and the condensate redistilled, yielding an azeotropic mixture of gamma-picoline and water containing 663 grams of gamma-picoline. This mixture was extracted three times with 620 cc. portions of benzene, and the benzene extracts distilled, yielding 642 grams of pure gamma-picoline which, together with 21 grams thereof present in the water raffinate from the benzene extraction, corresponded to a yield of 91.6%. The gamma-picoline was of better than 99% purity.

EXAMPLE VI

*Preparation of catalyst*

In four gallons of distilled water there were dissolved 9.5 pounds of C. P. cupric nitrate trihydrate, 7.75 pounds of C. P. chromic nitrate nonahydrate, and 0.0463 pound of C. P. anhydrous sodium sulfate. This solution was poured over one cu. ft. (about 50 pounds) of a low-soda-content activated gamma-alumina being marketed under the trade-name "Alorco F–10," and of a size passing a 4-mesh screen but retained on an 8-mesh screen. The mass was stirred in a rotary tumbler to coat the alumina evenly with the solution, and the solution was evaporated to dryness. The solid particles were heated for four hours in a stream of air at 350° C., and then were cooled and screened to remove dust. Five hundred cc. of this catalyst was charged into an iron reactor tube 2 inches in inside diameter and 36 inches long and the mass was reduced in a stream of hydrogen at 275° C. until the formation of water had ceased. The catalyst contained about 5.0% of copper, about 2.0% of chromium, and about 0.093% of sodium sulfate, the balance being alumina.

During 7.5 hours, 410 grams of 2-ethoxy-4-methyl-3,4-dihydro-2H-pyran and 900 grams of water were vaporized and the vapors mixed with 420 liters (290 grams) of gaseous ammonia and 375 liters (about 31 grams) of hydrogen, and the mixed vapors were passed over the heated catalyst maintained at 275° C. at a rate of 1020 liters per liter of catalyst per hour. The effluent vapors were condensed, and the condensate extracted three times with benzene, each time using a third of its volume of benzene. Distillation of the extracts yielded 220 grams of pure gamma-picoline which, with 12.6 grams thereof present in the raffinate from the extraction, gave an 87% yield of this compound, based upon the aforesaid dihydropyran starting material.

EXAMPLE VII

Using the reactor and catalyst described in Example I, heated to 275° C. there were fed into contact with the catalyst at a rate of 1000 liters per liter of catalyst per hour a mixture of vapors made by vaporizing 180 cc. (171.5 grams) of 2-methoxy-3-ethyl-4-methyl-3,4-dihydro-2H-pyran and 525 cc. of water, and mixing the vapors with 257 liters (178 grams) of gaseous ammonia and 225 liters (about 18 grams) of hydrogen. The effluent vapors were condensed at about 30° C., and the condensate was extracted with three separate portions, each of 130 cc. of benzene. Fractional distillation of the combined extracts under vacuum yielded 85.3 grams of pure 3-ethyl-4-methylpyridine (beta-collidine) boiling at 89.5° C., under 23 mm. of mercury, absolute pressure. It formed a picrate melting at 149°–150° C. The yield of beta-collidine was 64.3%, based upon the substituted dihydropyran starting material.

EXAMPLE VIII

Following the general procedure described in Example VII and using the catalyst employed in that example, 200 cc. (216 grams) of 2-ethoxy-4-n-propyl-5-ethyl-3,4-dihydro-2H-pyran and 430 cc. of water were vaporized separately and the vapors were mixed with 170 liters of gaseous ammonia and 150 liters of hydrogen. The mixed vapors were led over the catalyst maintained at 275° C., at a rate of about 1100 liters of vapors per liter of catalyst per hour. The effluent vapors were condensed, and the condensate was extracted with benzene. The benzene extract was fractionally redistilled, yielding 63 grams of 3-ethyl-4-n-propylpyridine, boiling at 224°–226° C., and having the following analysis:

|  | Theoretical for $C_{10}H_{15}N$ | Found |
|---|---|---|
| Carbon, Percent | 80.5 | 79.8 |
| Hydrogen, Percent | 10.1 | 10.7 |
| Nitrogen, Percent | 9.4 | 9.1 |
| Equivalent Weight | 149.2 | 148 |

It yielded a picrate melting at 132.5°–134° C.

EXAMPLE IX

Utilizing the catalyst used in Example VIII, heated to 275° C., 390 cc. (386 grams) of 2-ethoxy-3-methyl-3,4-dihydro-2H-pyran and 1210 cc. of water were separately vaporized and fed during 7 hours in admixture with 400 liters of ammonia and 350 liters of hydrogen over the catalyst at a rate of about 1300 liters of vapors per liter of catalyst per hour. The effluent vapors were condensed at about 30° C., and the condensate extracted with benzene. The combined extracts were fractionally distilled, yielding 210 grams of pure beta-picoline (3-methyl pyridine), corresponding to an 83% yield thereof, based upon the substituted dihydropyran starting material. A picrate prepared from this beta-picoline melted at 149° C.

EXAMPLE X

In a run similar to that of Example IX, utilizing the catalyst recovered from that run, 450 cc. (414 grams) of 2-ethoxy-3,4-dimethyl-3,4-dihydro-2H-pyran and 1160 cc. of water were separately vaporized, the vapors mixed with 450 liters of gaseous ammonia and 400 liters of hydrogen, and the mixture conducted over the catalyst heated at 275° C., at a rate of 1107 liters per liter of catalyst per hour. The effluent vapors were condensed at about 30° C., the condensate was extracted with benzene, and the resultant extract was fractionally distilled, yielding 214 grams of beta, gamma-lutidine (3,4-dimethylpyridine) corresponding to a yield of 75.4%, based upon the substituted dihydropyran starting material. A picrate prepared from this material melted at 163° C.

EXAMPLE XI

Using the catalyst recovered from Example X, reactivated by heating at 350° C. in air for 16 hours and then reducing it with hydrogen at 275° C. until water ceased to be evolved—213 grams of 2-ethoxy-4-propyl-6-methyl-3,4-dihydro-2H-pyran, 670 grams of water and 157 grams of ammonia were separately vaporized, mixed together with 225 liters of hydrogen, and led over the catalyst maintained at 275° C. during 4.25 hours at a rate of 1190 liters per liter of catalyst per hour. The effluent vapors were condensed at about 30° C., and the condensate separated into two layers. The upper (oil) layer was separated, and the lower aqueous layer was extracted three times with a total of 750 cc. of benzene. The combined extracts and the oil layer were combined and fractionally distilled. A fraction boiling at 179° C. at atmospheric pressure and at 94° C. under an absolute pressure of 5 mm. of mercury consisted of 2-methyl-4-propyl pyridine, contaminated with some of the unreacted starting material. This fraction was diluted with 200 cc. of benzene and washed three times with a total of 130 cc. of a 20% aqueous hydrochloric acid solution. The aqueous acidic layer was then separated and made alkaline with a dilute aqueous sodium hydroxide solution. The oil which separated was distilled under vacuum, yielding 71 grams of 2-methyl-4-propyl pyridine, having the following properties: B. P., 194°–194.5° C. under an absolute pressure of 742 mm. of mercury;

$$\text{Sp. Gr.} \frac{20°\text{ C.}}{20°\text{ C.}} = 0.9110$$

$n_D^{30.3°} = 1.4906$. It analyzed:

|  | Theoretical for $C_9H_{13}N$ | Observed |
| --- | --- | --- |
| Carbon, Percent | 80.0 | 79.6 |
| Hydrogen, Percent | 9.7 | 9.9 |
| Nitrogen, Percent | 10.4 | 10.1 |
| Equivalent weight | 135.2 | 135.2 |

Other representative substituted dihydropyrans useful in the process include: 2-methoxy-3,4-dihydro-2H-pyran, 2 - isopropoxy - 3,4 - dihydro - 2H - pyran, 2 - ethoxy-3-methyl-3,4-dihydro-2H-pyran, 2-isopropoxy-4-ethyl-3,4-dihydro - 2H - pyran, 2 - propoxy - 5 - propyl - 3,4 - dihydro-2H-pyran, 2-methoxy-4,5-dimethyl-3,4-dihydro-2H-pyran, 2-ethoxy-5,6-dimethyl-3,4-dihydro-2H-pyran, 2-(2-ethoxyethoxy)-4-methyl-3,4-dihydro-2H-pyran, 2-(2-methoxyethoxy)-3-ethyl-3,4-dihydro-2H-pyran, and 2-(2 - isopropoxyethoxy) - 5,6 - dimethyl - 3,4 - dihydro-2H-pyran.

What is claimed is:

1. Process for the production of pyridine, which comprises contacting a vaporous mixture comprising a 2-alkoxy-3,4-dihydro-2H-pyran, ammonia, steam and added hydrogen with a solid catalyst comprising a substantially alkali-free activated alumina, copper, chromium and an alkali metal sulfate, at a temperature within the range between about 200° C. and about 350° C., said vaporous mixture comprising between 1 and 8 mols of ammonia, between 8 and 24 mols of steam, and between 1 and 10 mols of hydrogen, per mol of the 2-alkoxy-3,4-dihydro-2H-pyran.

2. Process as defined in claim 1 wherein said solid catalyst comprises from 93 to 99% of activated alumina, from 0.5 to 5.0% of copper, from 0.2 to 2.0% of chromium, and from 0.01 to 0.1% of an alkali metal sulfate, all by weight, and wherein the weight ratio of chromium to copper is within the range from about 0.04 to about 0.4, and the weight ratio of alkali metal sulfate to copper does not exceed 0.2.

3. Process for the production of an alkylated pyridine base, which comprises contacting a vaporous mixture containing an alkylated 2-alkoxy-3,4-dihydro-2H-pyran having at least one alkyl group connected with a corresponding carbon atom of the dihydropyran ring, ammonia, steam and added hydrogen with a solid catalyst comprising a substantially alkali-free activated alumina, copper and chromium at a temperature within the range between about 200° C. and about 350° C., said vaporous mixture comprising between 1 and 8 mols of ammonia, between 8 and 24 mols of steam, and between 1 and 10 mols of hydrogen, per mol of the said pyran.

4. Process for the production of an alkylated pyridine base, which comprises contacting a vaporous mixture containing an alkylated 2-alkoxy-3,4-dihydro-2H-pyran having at least one alkyl group connected with a corresponding carbon atom of the dihydropyran ring, ammonia, steam and added hydrogen with a solid catalyst comprising a substantially alkali-free activated alumina, copper, chromium and an alkali metal sulfate, at a temperature within the range between about 200° C. and about 350° C., said vaporous mixture comprising between 1 and 8 mols of ammonia, between 8 and 24 mols of steam, and between 1 and 10 mols of hydrogen, per mol of the said pyran.

5. A hydrogenation catalyst stabilized for effective use for the production of pyridine bases by the reaction of ammonia on a 2-alkoxy-3,4-dihydro-2H-pyran, which catalyst comprises a substantially alkali-free activated alumina, copper and chromium, said copper, chromium and alumina being present in a weight ratio of between about 0.5 part and about 5.0 parts of copper, and between about 0.2 parts and about 2.0 parts of chromium per 100 parts of activated alumina, the weight ratio of chromium to copper being within the range from about 0.04 to about 0.4

6. A hydrogenation catalyst stabilized for effective use for the production of pyridine bases, which catalyst consists essentially of a substantially alkali-free activated alumina, copper, chromium and an alkali metal sulfate; said copper, chromium and alumina being present in a weight ratio of between about 0.5 part and about 5.0 of copper, and between about 0.2 part to about 2 parts of chromium per 100 parts of activated alumina, and said alkali metal sulfate being present in a weight ratio of between about 0.01 part and about 0.1 part per 100 parts of activated alumina, the weight ratio of chromium to copper being within the range between about 0.04 and about 0.4, and the weight ratio of alkali metal sulfate to copper not exceeding 0.2.

References Cited in the file of this patent

UNITED STATES PATENTS

| | | |
| --- | --- | --- |
| 1,500,794 | Bouvier et al. | July 8, 1924 |
| 1,844,857 | Larson | Feb. 9, 1932 |
| 2,019,883 | Wulff et al. | Nov. 5, 1935 |
| 2,184,235 | Groll et al. | Dec. 19, 1939 |
| 2,280,060 | Burk et al. | Apr. 21, 1942 |
| 2,523,686 | Engel | Sept. 26, 1950 |
| 2,528,978 | Smith et al. | Nov. 7, 1950 |